United States Patent
Horishita

(10) Patent No.: US 12,501,051 B2
(45) Date of Patent: Dec. 16, 2025

(54) CODING APPARATUS AND METHOD, AND STORAGE MEDIUM

(71) Applicant: CANON KABUSHIKI KAISHA, Tokyo (JP)

(72) Inventor: Yusuke Horishita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/457,441

(22) Filed: Aug. 29, 2023

(65) Prior Publication Data

US 2023/0403399 A1 Dec. 14, 2023

Related U.S. Application Data

(63) Continuation of application No. PCT/JP2022/003498, filed on Jan. 31, 2022.

(30) Foreign Application Priority Data

Mar. 19, 2021 (JP) ................................. 2021-046238
Jan. 12, 2022 (JP) ................................. 2022-003254

(51) Int. Cl.
*H04N 19/159* (2014.01)
*H04N 19/136* (2014.01)
(Continued)

(52) U.S. Cl.
CPC ......... *H04N 19/146* (2014.11); *H04N 19/136* (2014.11); *H04N 19/159* (2014.11); *H04N 19/176* (2014.11)

(58) Field of Classification Search
CPC .. H04N 19/146; H04N 19/136; H04N 19/159; H04N 19/176
(Continued)

(56) References Cited

U.S. PATENT DOCUMENTS 8,588,301 B2 11/2013 Kobayashi
8,842,923 B2 9/2014 Fukuhara
(Continued)

FOREIGN PATENT DOCUMENTS

JP 2006-094081 A 4/2006
JP 2008-054182 A 3/2008
(Continued)

OTHER PUBLICATIONS

Benjamin Bross, et al., "Versatile Video Coding Editorial Refinements on Draft 10," JVET-T2001-v1, Joint Video Experts Team (JVET) of ITU-T SG 16 WP 3 and ISO/IEC JTC 1/SC 29, 20th Meeting, by teleconference, Oct. 7-16, 2020, pp. 1-512.
(Continued)

*Primary Examiner* — Albert Kir
(74) *Attorney, Agent, or Firm* — Venable LLP

(57) ABSTRACT

A coding apparatus that performs coding processing on each block of an input image comprises a coding unit that executes coding processing using an inter-prediction mode, an intra-prediction mode or a multi-reference prediction mode, an output unit that outputs a result of the coding processing as coded data; and a calculation unit that calculates a first coding cost if the block is coded in the inter-prediction mode and a second coding cost if the block is coded in the intra-prediction mode using a predetermined function. The coding unit executes the coding processing using the multi-reference prediction mode if a difference between the first coding cost and the second coding cost is equal to or less than a threshold, and using the prediction mode with a smaller one of the first coding cost and the second coding cost if the difference is larger than the threshold.

10 Claims, 10 Drawing Sheets

(51) Int. Cl.
*H04N 19/146* (2014.01)
*H04N 19/176* (2014.01)

(58) Field of Classification Search
USPC ..................................... 375/240.02
See application file for complete search history.

(56) References Cited

U.S. PATENT DOCUMENTS

| 9,367,755 | B2 | 6/2016 | Fukuhara |
| 9,609,343 | B1 | 3/2017 | Chen |
| 10,713,706 | B1* | 7/2020 | Thankachan ........... G06N 20/20 |
| 2013/0129239 | A1 | 5/2013 | Fukuhara |
| 2014/0376829 | A1 | 12/2014 | Fukuhara |
| 2020/0314432 | A1* | 10/2020 | Wang .................... H04N 19/147 |
| 2022/0394269 | A1* | 12/2022 | Cao ....................... H04N 19/159 |
| 2024/0022738 | A1* | 1/2024 | Zhao ..................... H04N 19/176 |

FOREIGN PATENT DOCUMENTS

| JP | 2008-219147 A | 9/2008 |
| JP | 2013-106333 A | 5/2013 |
| JP | 2013-138502 A | 7/2013 |
| JP | 2015-226263 A | 12/2015 |

OTHER PUBLICATIONS

Jianle Chen, et al., "Algorithm Description for Versatile Video Coding and Test Model 10 (VTM10)," JVET-S2002-v1, Joint Video Experts Team (JVET) of ITU-T SG 16 WP 3 and ISO/IEC JTC 1/SC 29/WG 11, 19th Meeting, by teleconference, Jun. 22, 2020-Jul. 1, 2020, pp. 1-3.
Run Cha, et al., "Improved Combined Inter-Intra Prediction Using Spatial-Variant Weighted Coefficient," 2011 IEEE International Conference on Multimedia and Expo, Sep. 6, 2011, pp. 1-5.
Mar. 22, 2022 International Search Report in International Patent Appln. No. PCT/JP2022/003498.
Oct. 22, 2024 Indian Official Action in Indian Patent Appln. No. 202347060149.
Dec. 23, 2024 European Official Action in European Patent Appln. No. 22770895.5.

* cited by examiner

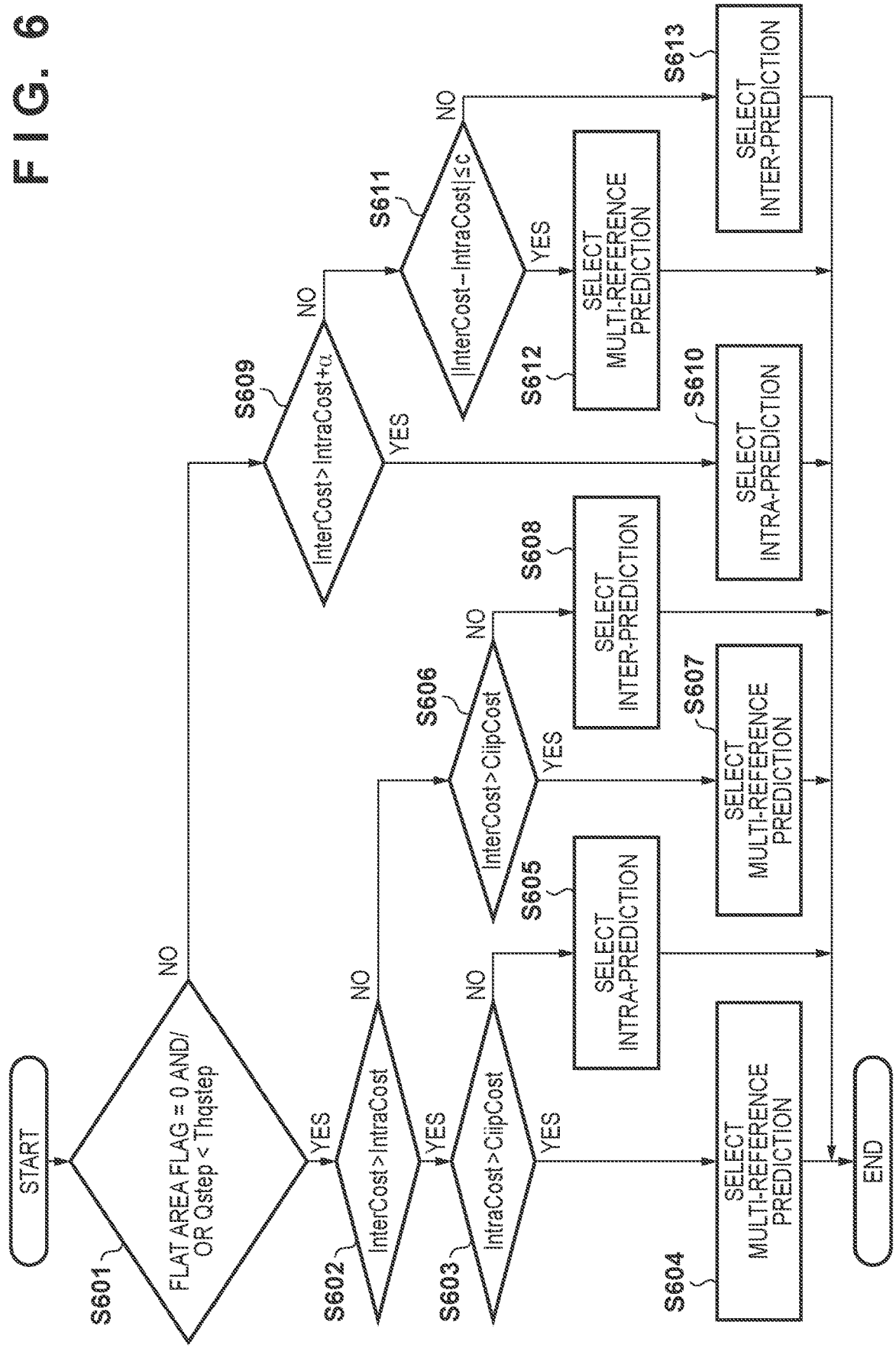

CODING APPARATUS AND METHOD, AND STORAGE MEDIUM

CROSS-REFERENCE TO RELATED APPLICATIONS

This application is a Continuation of International Patent Application No. PCT/JP2022/003498, filed Jan. 31, 2022, which claims the benefit of Japanese Patent Application No. 2021-046238, filed Mar. 19, 2021 and Japanese Patent Application No. 2022-003254, filed Jan. 12, 2022, all of which are hereby incorporated by reference herein in their entirety.

BACKGROUND OF THE INVENTION

Field of the Invention

The present invention relates to a coding apparatus and method, and storage medium, and more particularly to predictive coding technology.

Background Art

In order to efficiently transmit, record, and reproduce moving images, a moving image coding apparatus that compresses and encodes moving image data and a moving image decoding apparatus that decodes and decompresses moving image data are used. As moving image encoding methods, H.264/AVC (Advanced Video Coding) and H.265/HEVC (High Efficiency Video Coding), which utilizes hybrid coding that reduces spatial and temporal redundancy of moving image data, are mainly used currently. Further, as a moving image encoding method of next generation, International standardization of H.266/VVC (Versatile Video Coding) is in progress (see "Versatile Video Coding (Draft 10)", JVET-S2001-vH, Joint Video Experts Team (JVET) of ITU-T SG 16 WP 3 and ISO/IEC JTC 1/SC 29/WG 11, 2020).

In this moving image encoding method, one screen is divided into small blocks called CU (Coding Unit), and coding/decoding processing is performed for each block. Further, in such a video coding method, a predicted image is normally generated based on a local decoded image obtained by encoding/decoding an input image, and a prediction error (sometimes called a "difference image" or "residual image") obtained by subtracting the predicted image from the input image is encoded. Inter-prediction and intra-prediction can be selected as a method for generating a predicted image.

In inter-slicing, which of intra-prediction and inter-prediction is used in coding is generally determined by comparing the cost value (coding cost) obtained using a cost function based on the prediction error value and the code amount of the prediction error. Here, since the predicted images obtained by intra-prediction and inter-prediction are different, if blocks encoded by intra-prediction and inter-prediction are adjacent to each other in the screen of an image to be encoded, the difference between the predicted images of the blocks may be visually recognized as an image quality difference. In general, people have a visual characteristic that they tend to notice changes in flat areas, so in flat areas of an image, the difference in image quality between blocks encoded by intra-prediction and inter-prediction due to the difference in the predicted images described above is more conspicuous, and may be perceived as deterioration of image quality.

In order to solve this problem, Japanese Patent Laid-Open No. 2006-094081 proposes the following technique. That is, the cost value is corrected such that the lower the activity indicating the flatness of each block, the intra-prediction mode is less likely to be selected, thereby preventing blocks encoded by intra-prediction and inter-prediction from being adjacent to each other in a flat portion of an image.

However, the technique described in Japanese Patent Laid-Open No. 2006-094081 does not completely prevent blocks of intra-prediction and inter-prediction from being adjacent to each other. In other words, even if the technique described in Japanese Patent Laid-Open No. 2006-094081 is used, blocks of intra-prediction and inter-prediction may be adjacent to each other depending on the degree of flatness of the image. In this case, the difference in image quality between blocks of intra-prediction and inter-prediction may be perceived as deterioration in image quality.

SUMMARY OF THE INVENTION

The present invention has been made in consideration of the above problems, and aims to make image quality deterioration due to differences in predicted images inconspicuous in a case where one image is coded using different predicted images.

According to the present invention, provided is an coding apparatus that divides an input image into blocks and performs coding processing on each block of the input image, comprising: a coding unit that executes coding processing on each block using one of prediction modes of an inter-prediction mode that generates an-inter predicted image by performing inter-prediction on a block and encodes a difference between the block and the inter-predicted image, an intra-prediction mode that generates an intra-predicted image by performing intra-prediction on a block and encodes a difference between the block and the intra-predicted image, and a multi-reference prediction mode that generates a multi-predicted image by combining an inter-predicted image and an intra-predicted image generated from a block, and encodes a difference between the block and the multi-predicted image; an output unit that outputs a result of the coding processing as coded data; and a calculation unit that calculates a first coding cost in a case where the block is coded in the inter-prediction mode and a second coding cost in a case where the block is coded in the intra-prediction mode using a predetermined function, wherein the coding unit executes the coding processing on the block using the multi-reference prediction mode in a case where a difference between the first coding cost and the second coding cost is equal to or less than a threshold, and executes the coding processing on the block using the prediction mode with a smaller one of the first coding cost and the second coding cost in a case where the difference between the first coding cost and the second coding cost is larger than the threshold.

Further, according to the present invention, provided is An coding method that divides an input image into blocks and performs coding processing on each block of the input image, comprising: a step of executing coding processing on each block using one of prediction modes of an inter-prediction mode that generates an inter-predicted image by performing inter-prediction on a block and encodes a difference between the block and the inter-predicted image, an intra-prediction mode that generates an intra-predicted image by performing intra-prediction on a block and encodes a difference between the block and the intra-predicted image, and a multi-reference prediction mode that generates a multi-predicted image by synthesizing an inter-predicted image and an intra-predicted image generated from a block, and encodes a difference between the block and the multi-predicted image; a step of outputting a result of the coding processing as coded data; and a step of calculating a first coding cost in a case where the block is coded in the inter-prediction mode and a second coding cost in a case where the block is coded in the intra-prediction mode using a predetermined function, wherein the coding processing is executed on the block using the multi-reference prediction mode in a case where a difference between the first coding cost and the second coding cost is equal to or less than a threshold, and the coding processing is executed on the block using the prediction mode with a smaller one of the first coding cost and the second coding cost in a case where the difference between the first coding cost and the second coding cost is larger than the threshold.

Furthermore, according to the present invention, provided is a non-transitory computer-readable storage medium, the storage medium storing a program that is executable by the computer, wherein the program includes program code for causing the computer to function as an coding apparatus that divides an input image into blocks and performs coding processing on each block of the input image, comprising: a coding unit that executes coding processing on each block using one of prediction modes of an inter-prediction mode that generates an-inter predicted image by performing inter-prediction on a block and encodes a difference between the block and the inter-predicted image, an intra-prediction mode that generates an intra-predicted image by performing intra-prediction on a block and encodes a difference between the block and the intra-predicted image, and a multi-reference prediction mode that generates a multi-predicted image by combining an inter-predicted image and an intra-predicted image generated from a block, and encodes a difference between the block and the multi-predicted image; an output unit that outputs a result of the coding processing as coded data; and a calculation unit that calculates a first coding cost in a case where the block is coded in the inter-prediction mode and a second coding cost in a case where the block is coded in the intra-prediction mode using a predetermined function, wherein the coding unit executes the coding processing on the block using the multi-reference prediction mode in a case where a difference between the first coding cost and the second coding cost is equal to or less than a threshold, and executes the coding processing on the block using the prediction mode with a smaller one of the first coding cost and the second coding cost in a case where the difference between the first coding cost and the second coding cost is larger than the threshold.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a flowchart illustrating a prediction mode determination method in a prediction mode selection unit according to the first embodiment.

DESCRIPTION OF THE EMBODIMENTS

Figure 1:
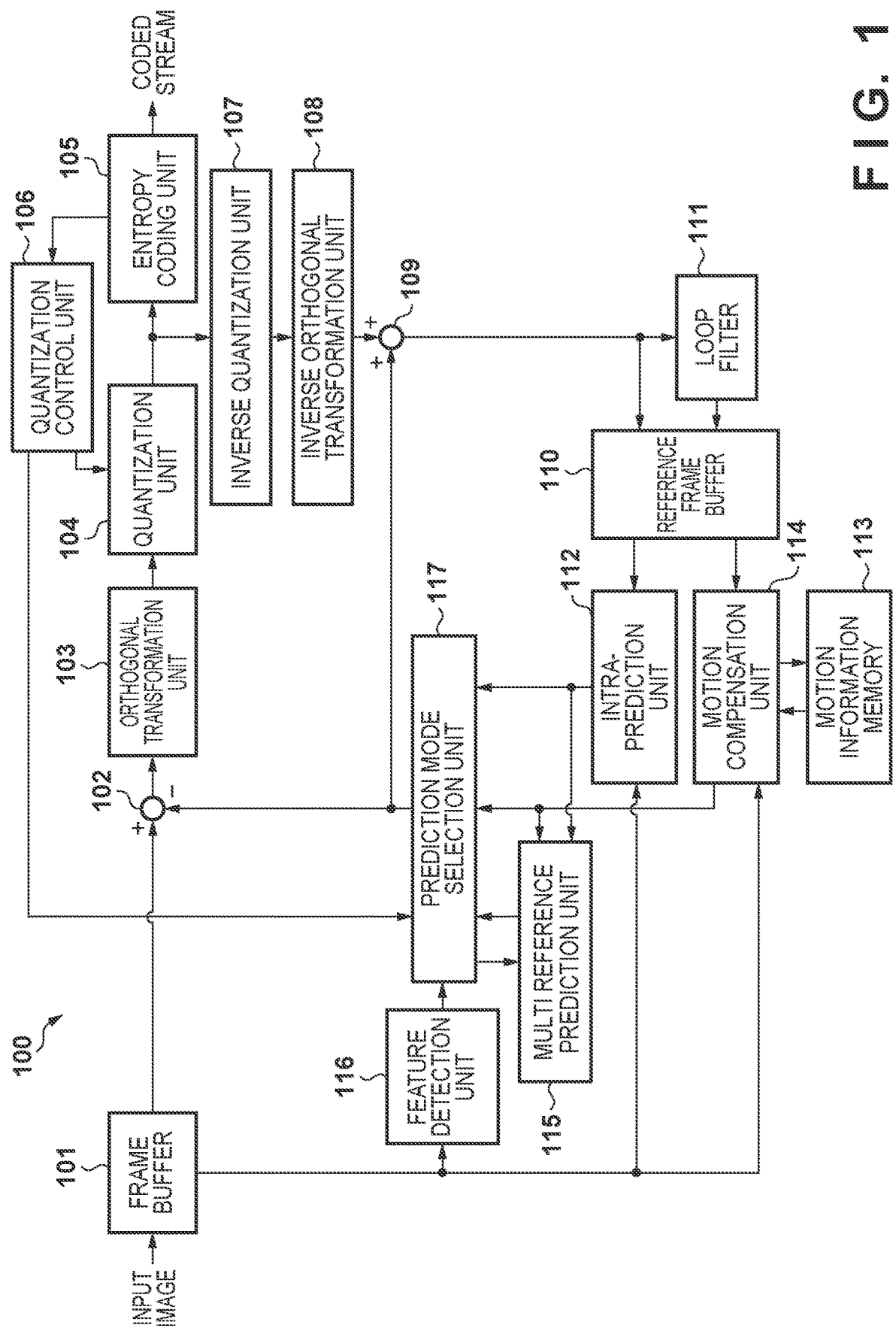
FIG. 1 is a block diagram illustrating a configuration of an image coding apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the configuration of an image coding apparatus 100 that performs predictive coding according to the embodiment. The image coding apparatus 100 may be arranged, for example, in an image processing engine incorporated in an image capturing apparatus.

A frame buffer 101 stores an input image to be encoded, and outputs image data of pixels of a required block size to an adder 102, intra-prediction unit 112, motion compensation unit 114, and feature detection unit 116.

The adder 102 generates difference image data between the image data output from the frame buffer 101 and predicted image data output from a prediction mode selection unit 117 described later, and outputs the difference image data to an orthogonal transformation unit 103.

The orthogonal transformation unit 103 performs orthogonal transform such as discrete cosine transform (DCT) and discrete sine transform (DST) on the difference image data, generates transform coefficients, and outputs the transform coefficients to a quantization unit 104.

The quantization unit 104 quantizes the transform coefficients output from the orthogonal transformation unit 103 according to the quantization step size (or quantization parameter) output by a quantization control unit 106, and outputs the results to an entropy coding unit 105, and an inverse quantization unit 107.

The entropy coding unit 105 performs variable-length coding on the quantized transform coefficients, motion vectors, parameters necessary for decoding processing, and the like, formats them into a predetermined format, and outputs them as a coded stream. Also, the entropy coding unit 105 calculates a generated code amount for each block and outputs it to the quantization control unit 106.

The quantization control unit 106 determines a quantization step size for each block and a quantization parameter Qp from the generated code amount output from the entropy coding unit 105 and a preset target code amount, and outputs them to the quantization unit 104 and the prediction mode selection unit 117.

The inverse quantization unit 107 performs inverse quantization on the quantized transform coefficients output from the quantization unit 104, generates transform coefficients, and outputs the transform coefficients to an inverse orthogonal transformation unit 108.

The inverse orthogonal transformation unit 108 applies inverse transformation of the orthogonal transformation applied by the orthogonal transformation unit 103 to the transform coefficients output from the inverse quantization unit 107, generates difference image data, and outputs the difference image data to an adder 109.

The adder 109 adds the difference image data generated by the inverse orthogonal transformation unit 108 and predicted image data output from the prediction mode selection unit 117, which will be described later, to generate locally decoded reference image data, and outputs it to a reference frame buffer 110 and a loop filter 111.

The loop filter 111 includes a deblocking filter, an adaptive loop filter, etc., removes block noise from the reference image data output from the adder 109, and outputs the result to the reference frame buffer 110. Note that the reference image data output from the adder 109 may be stored in the reference frame buffer 110 without going through the loop filter 111 as described above. In other words, the filtering process by the loop filter 111 can be omitted.

The reference frame buffer 110 stores the supplied reference image data, and outputs the stored reference image data to the intra-prediction unit 112 and the motion compensation unit 114 at predetermined timings.

The intra-prediction unit 112 performs intra-prediction using the image data of a coding target block output from the frame buffer 101 and reference image data of blocks around the coding target block read out from the reference frame buffer 110.

Here, intra-prediction modes selectable by the intra-prediction unit 112 will be described with reference to FIG. 2.

Figure 2:
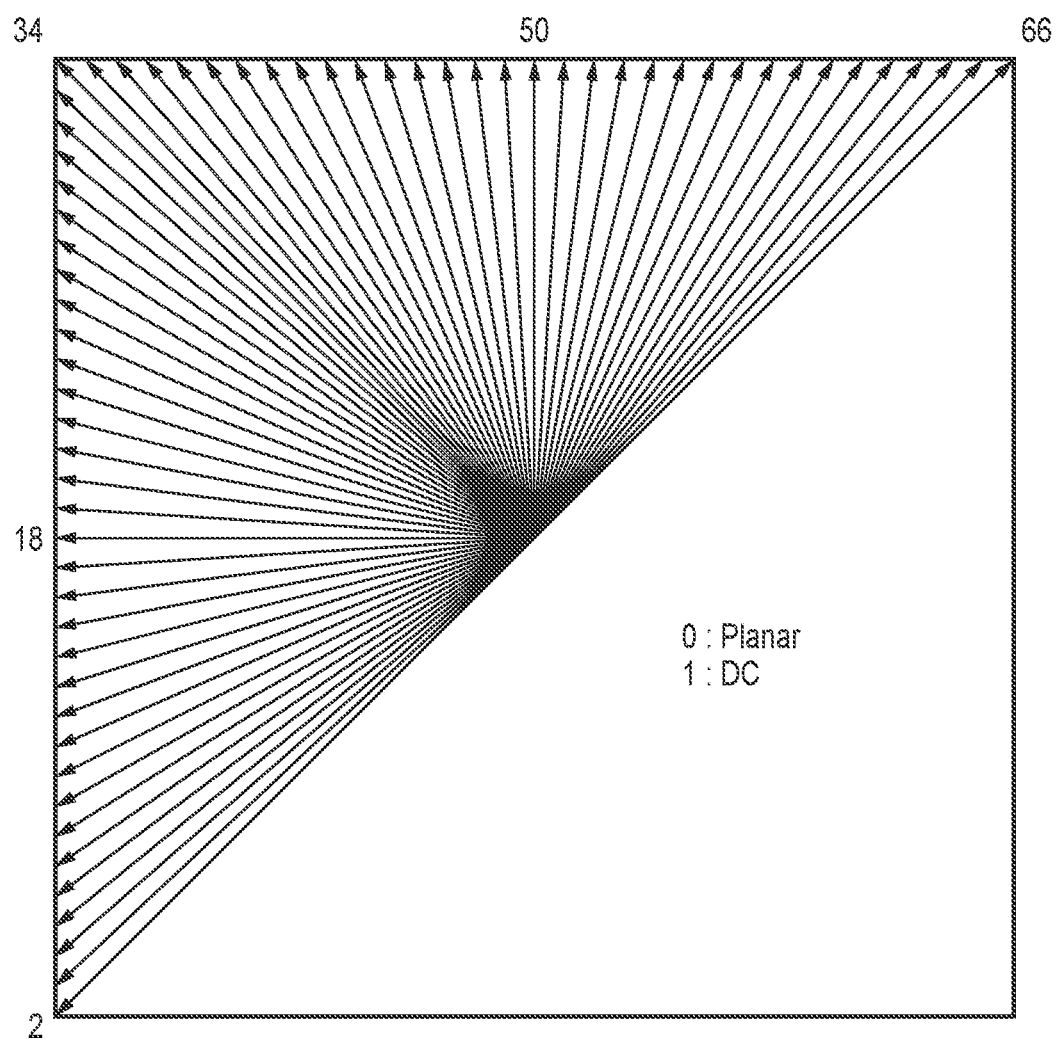
FIG. 2 is schematic diagram showing types (mode numbers) of intra-prediction modes.

FIG. 2 is a diagram showing types of intra-prediction modes (mode numbers). The intra-prediction unit 112 can select an intra-prediction mode from planar prediction (mode number 0), DC prediction (mode number 1), and 65 types of directional prediction (mode numbers 2 to 66).

Further, the intra-prediction unit 112 selects the intra-prediction mode with the smallest cost value according to the cost function indicating the coding efficiency among the intra-prediction modes. Various functions are conceivable as the cost function, and the following equation (1) is used as a representative equation in this embodiment.

$$IntraCost = SATD + Qp \times Mdcost \quad (1)$$

In the equation (1), IntraCost represents a cost value that indicates the coding efficiency in intra-prediction mode, and SATD represents a value obtained by taking a difference between input image data to be encoded and the reference image data, applying Hadamard transform to obtained difference data, and taking a sum of absolute differences of the transformed difference data. Qp represents a quantization parameter used in the quantization unit 104, and Mdcost represents a cost value corresponding to a code amount obtained in an intra-prediction mode.

The intra-prediction unit 112 generates a predicted image for intra-prediction using the intra-prediction mode selected using the equation (1). In addition, the intra-prediction unit 112 outputs the selected intra-prediction mode, the cost value when the selected intra-prediction mode is applied, and the predicted image data (intra-predicted image) generated by the intra-prediction, to a multi-reference prediction unit 115 and the prediction mode selection unit 117.

A motion information memory 113 is a memory for temporarily holding motion vectors output from a motion compensation unit 114, which will be described later. The motion information memory 113 may also hold the motion vectors of the blocks located around the coding target block, and the motion vector of each of the blocks of already coded frame or frames. Information of the motion vectors held in the motion information memory 113 is referred to by the motion compensation unit 114, which will be described later.

The motion compensation unit 114 selects the optimal motion vector from among two modes: an inter mode for newly searching for a motion vector and a merge mode for selecting the optimal motion vector from motion vector candidates of already coded blocks.

Figure 3:
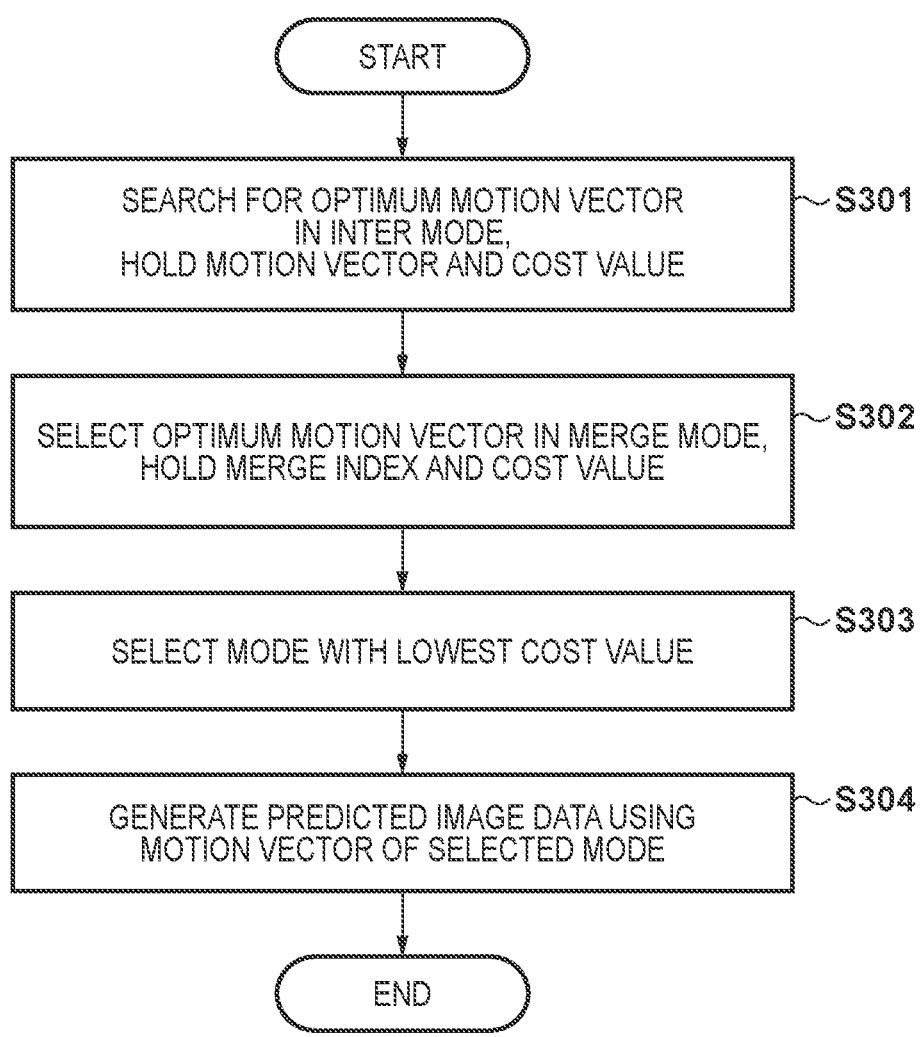
FIG. 3 is a flowchart illustrating an operation of a motion compensation unit according to a first embodiment.

Here, the operation of the motion compensation unit 114 will be explained using FIG. 3.

In step S301, the motion compensation unit 114 uses the image data of the coding target block output from the frame buffer 101 and the reference image data read out from the reference frame buffer 110 to search for the optimum motion vector in the inter mode. More specifically, the motion compensation unit 114 searches for the motion vector with the lowest cost value calculated using the cost function that indicates coding efficiency. Although various functions are conceivable as the cost function, the equation (2) is used as a representative one in this embodiment.

$$InterCost = SATD + Qp \times Mvcost \quad (2)$$

In Equation (2), InterCost represents a cost value indicating coding efficiency in the inter mode. SATD represents a value obtained by taking a difference between input image data to be encoded and the reference image data after motion vector is applied, applying Hadamard transform to obtained difference data, and taking a sum of absolute differences of the transformed difference data. Qp is a quantization parameter used in the quantization unit 104, and Mvcost is a cost value corresponding to a code amount of motion vector.

The motion compensation unit 114 temporarily holds the information of the motion vector determined using the equation (2) and the cost value obtained when the motion vector is applied.

In step S302, the motion compensation unit 114 selects the optimum motion vector in the merge mode from a plurality of motion vector candidates already stored in the motion information memory 113. More specifically, the motion compensation unit 114 applies the equation (2) to each of the plurality of motion vector candidates and selects the motion vector with the lowest cost value. The motion compensation unit 114 also calculates an index value (merge index) indicating the motion vector candidate.

The motion compensation unit 114 temporarily holds the merge index and the cost value obtained when the motion vector indicated by the merge index is applied.

In step S303, the motion compensation unit 114 compares the cost value in the inter mode calculated in step S301 and the cost value in the merge mode calculated in step S302, and selects the mode with the lowest cost value.

In step S304, the motion compensation unit 114 uses the motion vector in the selected mode and the reference image data read out from the reference frame buffer 110 to generate predicted image data for inter-prediction. In the merge mode, the motion vector can be determined by referring to the merge index calculated in step S302.

The motion compensation unit 114 outputs a flag (merge flag) indicating whether or not the merge mode has been selected, information on motion vector or merge index, the cost value in the selected mode, and the generated predicted image data for inter-prediction (inter-predicted image) to the multi-reference prediction unit 115 and the prediction mode selection unit 117.

The multi-reference prediction unit 115 combines the predicted image data for intra-prediction output from the intra-prediction unit 112 and the predicted image data for inter-prediction output from the motion compensation unit 114 to generate new predicted image data.

As a technique for combining predicted image data for intra-prediction and predicted image data for inter-prediction, in "Algorithm description for Versatile Video Coding and Test Mode 10 (VTM10)", JVET-S2002-v1, Joint Video Experts Team (JVET) of ITU-T SG 16 WP 3 and ISO/IEC JTC 1/SC 29/WG 11, 2020, a technology called Combined Inter and Intra Prediction (CIIP) is disclosed. The method of combining the predicted image data for intra-prediction and predicted image data for inter-prediction is also based on CIIP. The method of combining the predicted image data by intra-prediction and predicted image data for inter-prediction is also based on CIIP. On the other hand, in "Algorithm description for Versatile Video Coding and Test Mode 10 (VTM10)", it is described, as application conditions of CIIP, that intra-predicted images are applied with PLANAR prediction, inter-predicted images are applied with merge mode, and so forth. However, the method of combining the predicted image data for intra-prediction and the predicted image data for inter-prediction in this embodiment is not necessarily limited to these conditions, and it is also possible to apply directional prediction, and like, to the predicted image data for intra-prediction.

In CIIP, predicted images for intra-prediction and inter-prediction are blended pixel by pixel, so that differences in predicted images between blocks can be further reduced. Based on this, in the present embodiment, CIIP is applied to blocks that exist in areas where intra-prediction and inter-prediction blocks are likely to be adjacent to each other, and image quality differences between blocks are likely to be noticeable, such as flat areas of an image. This reduces image quality degradation caused by using different prediction modes to generate predicted images of adjacent blocks.

Next, details of a method of combining predicted image data for intra-prediction and predicted image data for inter-prediction performed by the multi-reference prediction unit 115 will be described below.

The multi-reference prediction unit 115 combines predicted image data by intra-prediction and predicted image data by inter-prediction for each pixel using the following equation (3).

$$Pciip = ((4-wt) \times Pinter + wt \times Pintra + 2)/4 \quad (3)$$

In the equation (3), Pintra represents the pixel value of predicted image data for intra-prediction, Pinter represents the pixel value of predicted image data for inter-prediction, and Pciip is the pixel value of predicted image data after combining them. wt represents a weighting coefficient indicating the ratio of pixel values for intra-prediction and inter-prediction, and can take an integer value from 1 to 3 here.

Here, a method of determining the weighting coefficient wt used in the multi-reference prediction unit 115 will be described with reference to FIG. 4.

In step S401, the multi-reference prediction unit 115 initializes isIntraTop and isIntraLeft to 0, and the weighting coefficient wt to 1. isIntraTop is a flag indicating whether or not the prediction mode of the encoded block that is adjacent to the coding target block in the upward direction is intra-prediction. Also, isIntraLeft is a flag indicating whether or not the prediction mode of the encoded block adjacent to the coding target block in the left direction is intra-prediction. Note that the prediction modes of these encoded blocks are held by the prediction mode selection unit 117 as described later, and the multi-reference prediction unit 115 can appropriately refer to this information.

In step S402, the multi-reference prediction unit 115 determines whether or not the prediction mode of the encoded block adjacent to the coding target block in the upward direction is intra-prediction. If the prediction mode of the encoded block adjacent in the upward direction is intra-prediction (Yes in step S402), the multi-reference prediction unit 115 sets isIntraTop to 1 in step S403. If the prediction mode of the encoded block adjacent in the upward direction is not intra-prediction (No in step S402), the multi-reference prediction unit 115 advances the process to step S404.

In step S404, the multi-reference prediction unit 115 determines whether or not the prediction mode of the encoded block adjacent to the coding target block in the left direction is intra-prediction. If the prediction mode of the encoded block adjacent in the left direction is intra-prediction (Yes in step S404), the multi-reference prediction unit 115 sets isIntraLeft to 1 in step S405. If the prediction mode of the encoded block adjacent in the left direction is not intra-prediction (No in step S404), the multi-reference prediction unit 115 advances the process to step S406.

In steps S406 to S410, the multi-reference prediction unit 115 determines the value of weighting coefficient wt according to the sum of isIntraTop and isIntraLeft. If the sum of isIntraTop and isIntraLeft is 2 (Yes in step S406), the process proceeds to step S407 where the multi-reference prediction unit 115 sets the weighting coefficient wt to 3. If the sum of isIntraTop and isIntraLeft is 1 (No in step S406 and Yes in step S408), the process proceeds to step S409 where the multi-reference prediction unit 115 sets the weighting coefficient wt to 2. If the sum of isIntraTop and isIntraLeft is 0 (No in step S406 and No in step S408), the process proceeds to step S410 where the multi-reference prediction unit 115 sets the weighting coefficient wt to one.

The processes of steps S406 to S410 adaptively change the combining percentages between the pixel values of the predicted image data for intra-prediction and the pixel values of the predicted image data for inter-prediction at the time of combining the predicted images, according to the prediction mode of the blocks surrounding the coding target block. As a result, in a case where multi-reference prediction is selected as the prediction mode in the prediction mode selection unit 117, which will be described later, image quality deterioration due to predicted images of the coding target block and its surrounding blocks being different from each other can be reduced.

Figure 4:
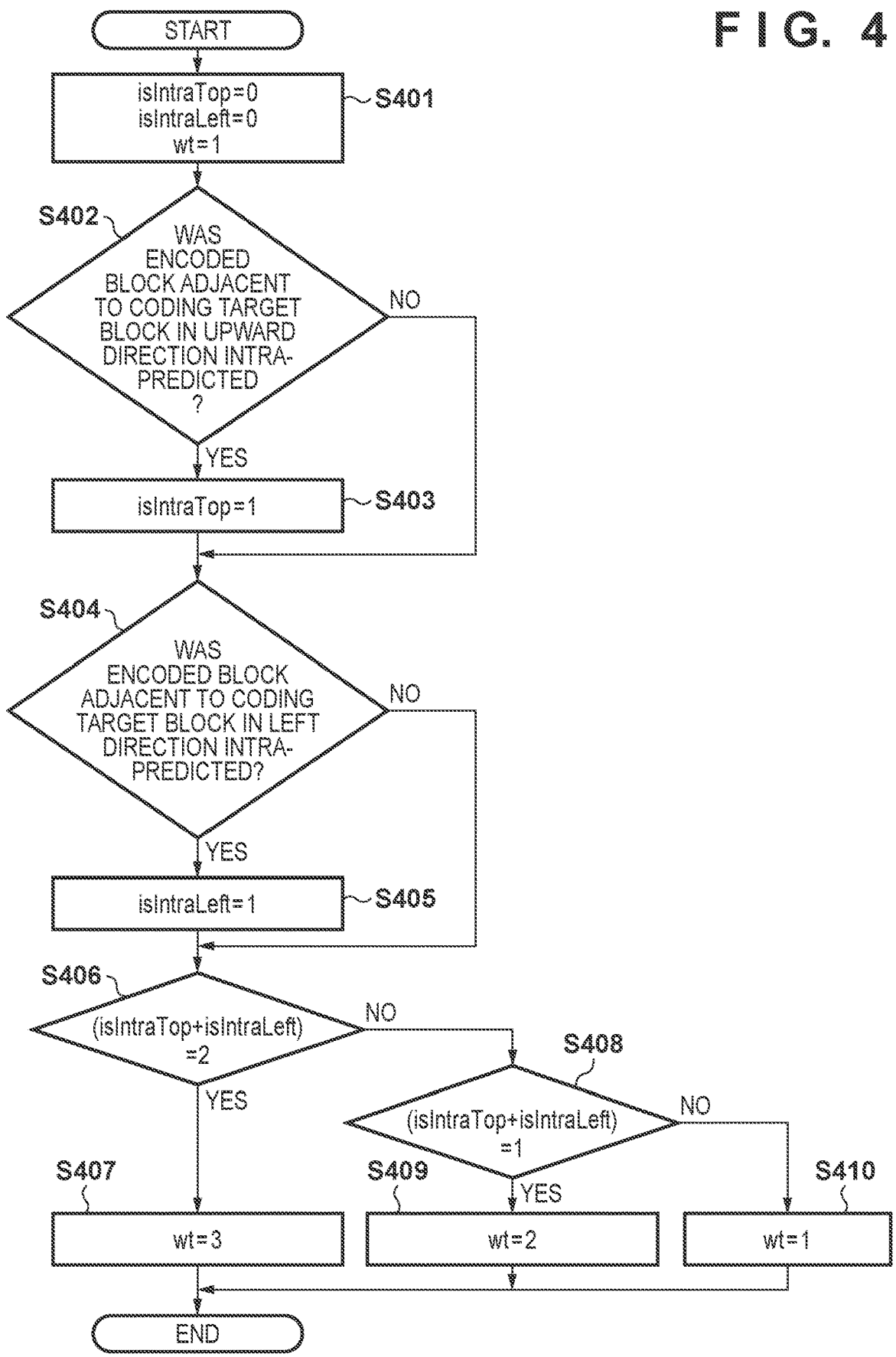
FIG. 4 is a flowchart illustrating a determination method of weighting coefficients in a multi-reference prediction unit according to the first embodiment.

Note that the method of synthesizing the predicted image data for intra-prediction and the predicted image data for inter-prediction is not limited to the example shown in the equation (3) and FIG. 4. For example, the multi-reference prediction unit 115 may perform the synthesis using the equation (4) below.

$$Pciip=((8-wt)\times Pinter+wt\times Pintra+4)/8 \quad (4)$$

As another example, the weighting coefficient wt can be adaptively changed for each pixel according to the pixel position of each pixel in the coding target block. Furthermore, the weighting coefficient wt can be adaptively changed according to the intra-prediction mode (DC prediction, PLANAR prediction, etc.) output from the intra-prediction unit 112, the block size of the coding target block, and the like.

The multi-reference prediction unit 115 uses predicted image data (multi-predicted image) synthesized using the equation (3) to calculate a cost value based on a cost function that indicates coding efficiency. Various functions are conceivable as the cost function, but in this embodiment, the equation (5) is used as a representative one.

$$CiipCost=SATD+Qp\times Mpcost \quad (5)$$

In the equation (5), CiipCost represents a cost value indicating coding efficiency in multi-reference prediction. SATD represents a value obtained by taking a difference between input image data to be encoded and the synthesized predicted image data, applying Hadamard transform to obtained difference data, and taking a sum of absolute differences of the transformed difference data. Qp is a quantization parameter used in the quantization unit 104, and Mpcost is a cost value corresponding to a code amount of parameters required in multi-reference prediction. Parameters required in multi-reference prediction include an intra-prediction mode output from the intra-prediction unit 112, merge flag, merge index, or motion vector output from the motion compensation unit 114.

The multi-reference prediction unit 115 outputs the cost value calculated using the equation (5) and the synthesized predicted image data to the prediction mode selection unit 117.

The feature detection unit 116 generates a flat area flag indicating whether the coding target block belongs to a flat area of the image and outputs it to the prediction mode selection unit 117. Here, a method of generating the flat area flag in the feature detection unit 116 will be described with reference to FIG. 5.

Figure 5:
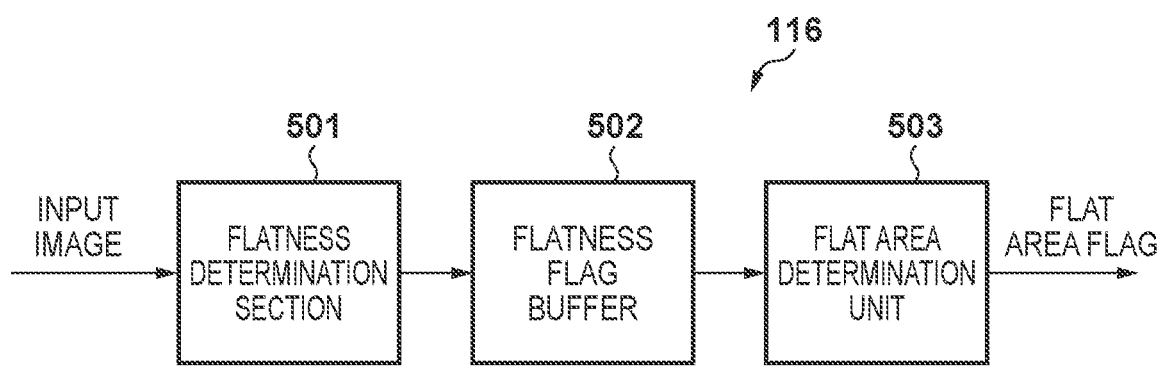
FIG. 5 is a block diagram illustrating an example of internal configuration of a feature detection unit according to the first embodiment.

FIG. 5 is a block diagram showing an example of the internal configuration of the feature detection unit 116.

A flatness determination unit 501 acquires an input image of the coding target block and generates a flag (flatness flag) indicating whether or not the coding target block is flat. Various methods are conceivable for determining whether or not the block is flat. In this embodiment, the flatness is defined as the variance of the pixel values of the coding target block, and if the flatness is lower than a predetermined threshold, the block is determined to be flat. In the present embodiment, the flag value is "1" if the block is determined to be flat, and the flag value is "0" if the block is determined to be not flat.

A flatness flag buffer 502 temporarily holds the flatness flag output from the flatness determination unit 501. The flatness flag buffer 502 also holds flatness flags of a plurality of encoded blocks, and a flat area determination unit 503, which will be described later, can appropriately refer to this information. The flatness flag buffer 502 in this embodiment holds at least the flatness flags of the encoded blocks adjacent to the coding target block in the upper direction, the upper left direction, and the left direction.

The flat area determination unit 503 determines whether the coding target block belongs to a flat area of the image based on the flatness flag of the coding target block and the flatness flags of a plurality of encoded blocks held in the flatness flag buffer 502. Various methods are conceivable as a method of determining whether or not the coding target block belongs to a flat area. In this embodiment, if the flag values of the flat flags of the encoded blocks adjacent in the upper direction, the upper left direction and the left direction are all "1", it is determined that the coding target block belongs to a flat area. In the present embodiment, the flag value is set to "1" if the block is determined that it belongs to a flat area, and the flag value is set to "0" if the block is determined that it does not belong to a flat area.

Note that the method of determining whether or not the coding target block belongs to a flat area is not limited to the example described using FIG. 5. For example, the feature detection unit 116 may simply assume that a coding target block belongs to a flat area if its flatness is lower than a predetermined threshold. Alternatively, the feature detection unit 116 may determine a flatness flag for each of the blocks of a frame and store the flatness flags in the flatness flag buffer 502 before starting the coding processing of the frame. This allows the flat area determination unit 503 to improve determination accuracy of whether or not the coding target block belongs to a flat area by referring not only to the flat flags of blocks adjacent to the coding target block, but also to the flat flags of blocks further away from the coding target block.

The prediction mode selection unit 117 selects one of the intra-prediction, inter-prediction, and multi-reference prediction. Here, the determination method of the prediction mode in the prediction mode selection unit 117 is explained using FIG. 6.

In step S601, the prediction mode selection unit 117 determines whether the flat area flag output from the feature detection unit 116 is 0 and/or whether or not the quantization step size Qstep of the coding target block obtained from the quantization control unit 106 is smaller than the threshold Thqstep.

Thereafter, in steps S602 to S608 following S601, the prediction mode selection unit 117 puts weight on coding efficiency and always selects the prediction mode with the lowest cost value. On the other hand, in steps S609 to S613, the prediction mode selection unit 117 puts weight on reduction of image quality degradation, and does not always select the prediction mode with the lowest cost value so that degradation of image quality due to different predicted images between blocks is less conspicuous. That is, the determination formula of step S601 means that the prediction mode selection unit 117 selects which one of the coding efficiency and the reduction of image quality deterioration is emphasized.

In this embodiment, in a case where the region to which the coding target block belongs is not flat and/or in a case where the quantization step size is small, it is determined that the degree of image quality deterioration due to different predicted images between blocks is small, and the processes of steps S602 to S608 are performed with emphasis on the encoding efficiency. Conversely, in a case where the region to which the coding target block belongs is flat and the quantization step size is large, the processes of S609 to S613 are performed with emphasis on reducing image quality deterioration. Note that the determination method in step S601 is not limited to the example shown here. For example, the prediction mode selection unit 117 can perform the determination using either the flat area flag or the quantization step size.

In step S601, if the flat area flag is 0 and/or the quantization step size Qstep is smaller than a threshold Thqstep, the prediction mode selection unit 117 advances the process to step S602.

In step S602, the prediction mode selection unit 117 compares the cost value IntraCost output from the intra-prediction unit 112 and the cost value InterCost output from the motion compensation unit 114.

If InterCost is greater than IntraCost (Yes in step S602), the prediction mode selection unit 117 compares IntraCost with the cost value CiipCost output from the multi-reference prediction unit 115 (step S603). If the IntraCost is greater than the CiipCost (Yes in step S603), the prediction mode selection unit 117 selects multi-reference prediction as the prediction mode (step S604). If the IntraCost is less than or equal to the CiipCost (No in step S603), the prediction mode selection unit 117 selects intra-prediction as the prediction mode (step S605).

Also, in step S602, if InterCost is less than or equal to IntraCost (No in step S602), the prediction mode selection unit 117 compares InterCost with CiipCost (step S606). If InterCost is greater than CiipCost (Yes in step S606), the prediction mode selection unit 117 selects multi-reference prediction as the prediction mode (step S607). If InterCost is less than or equal to CiipCost (No in step S606), the prediction mode selection unit 117 selects inter-prediction as the prediction mode (step S608).

On the other hand, in step S601, if the flat area flag output from the feature detection unit 116 is 1 and the quantization step size Qstep is equal to or greater than the threshold Thqstep, the prediction mode selection unit 117 advances the process to step S609.

In step S609, the prediction mode selection unit 117 compares InterCost with the values of IntraCost+$\alpha$. $\alpha$ is a correction value for the cost value of intra-prediction that can be arbitrarily set.

Generally, in a region where the cost values of intra-prediction and inter-prediction are about the same, image quality deterioration in intra-prediction tends to be more conspicuous than that in inter-prediction. Therefore, in this embodiment, if the coding target block belongs to a flat area, inter-prediction is preferentially selected by correcting the cost value of intra-prediction. As a result, cases in which blocks of intra-prediction and blocks of inter-prediction are adjacent to each other are reduced.

In this embodiment, the cost value is corrected by adding $\alpha$ as described above, but it is also possible to correct the cost value by subtracting, multiplying, or dividing the cost value by an arbitrary constant. Also, the method of correcting the cost value is not limited to the method using $\alpha$ as described above, and any method may be adopted as long as the method enables inter-prediction to be preferentially selected.

If InterCost is greater than IntraCost+$\alpha$ (Yes in step S609), the prediction mode selection unit 117 selects intra-prediction as the prediction mode (step S610).

If InterCost is equal to or less than IntraCost+$\alpha$ (No in step S609), the prediction mode selection unit 117 determines whether the absolute value of the difference between InterCost and IntraCost is equal to or less than a constant c (step S611). Here, the details of the determination formula used in step S611 will be described.

As described above, the determination in step S609 is intended to preferentially select inter-prediction. On the other hand, depending on the degree of flatness of the image, an area in which blocks of intra-prediction and blocks of inter-prediction often become adjacent to each other, and the determination result of step S609 frequently switches still exists. Here, in an area where the determination result of step S609 frequently changes, it is assumed that the values of InterCost and IntraCost+$\alpha$ are close to each other in the determination formula used in step S609. In consideration of the above, in the present embodiment, the area where the determination result in step S609 frequently changes is detected using the following expression (6).

$$|\text{InterCost} - (\text{IntraCost}+\alpha)| \leq \beta \quad (6)$$

$\beta$ is a constant for detecting the closeness between InterCost and the values of IntraCost+$\alpha$. Here, assuming that $\alpha$ is a positive constant, the following expression (7) is obtained by modifying the expression (6).

$$|\text{InterCost} - \text{IntraCost}| \leq \beta + \alpha = c \quad (7)$$

That is, in the present embodiment, in a case where the absolute value of the difference between the InterCost and IntraCost of the coding target block is equal to or less than the constant c in step S611, it is determined that the block exists in an area where blocks of intra-prediction and blocks of inter-prediction block tend to be adjacent to each other.

Note that the constant c can be set arbitrarily, and may be adaptively changed using the target bit rate of the image coding apparatus, the value of the quantization parameter Qp used in the quantization unit 104, or the characteristics of the image. For example, the value of the constant c can be changed for each block according to the flatness, and the like, calculated by the flatness determination unit 501.

If the absolute value of the difference between InterCost and IntraCost is c or less (Yes in step S611), the prediction mode selection unit 117 selects multi-reference prediction as the prediction mode (step S612). That is, in the present embodiment, multi-reference prediction is applied to blocks existing in an area where blocks of intra-prediction and blocks of inter-prediction block tends to be adjacent to each other. In a case where multi-reference prediction is used, since a predicted image of intra-prediction and a predicted image of inter-prediction predicted are blended and the difference in predicted images between blocks becomes small, it is possible to reduce image quality degradation caused by predicted images being generated using different prediction modes between blocks.

In multi-reference prediction, it is necessary to encode parameters related to prediction modes for both intra-prediction and inter-prediction (intra-prediction mode, motion vector, etc.), there is a risk that a code amount related to parameters will be larger in multi-reference prediction than in inter-prediction. Therefore, the prediction mode selection unit 117 may further perform determination of whether or not the value of the merge flag output from the motion compensation unit 114 is 1 in the determination of step S611. As a result, when multi-reference prediction is selected, there is no need to encode parameters related to motion vectors, and an increase in code amount related to parameters can be suppressed.

If the absolute value of the difference between InterCost and IntraCost is not equal to or less than the constant c (No in step S611), the prediction mode selection unit 117 selects inter-prediction as the prediction mode (step S613).

A predicted image is generated according to the prediction mode selected as described above. Then, the difference between the image data of the coding target block and the predicted image is encoded, and the coded result is output as a coded stream (coded data).

In the example shown in FIG. 6, if an area is in the flat part of the image and if the quantization step size is large, the area is detected as an area where blocks of intra-prediction and blocks of inter-prediction tend to be adjacent to each other, and the prediction mode that prioritizes reduction of image quality deterioration is applied in this area. On the other hand, there are cases where the boundary between a block of intra-prediction and a block of inter-prediction is conspicuous regardless of the degree of flatness of the image, depending on the target bit rate of the image coding apparatus. In such a case, the prediction mode selection unit 117 may not perform the determination of step S601, and may always detect an area where a block of intra-prediction and a block of inter-prediction tend to be adjacent to each other, and apply multi-reference prediction to the blocks existing in the detected area.

In addition, regardless of whether the boundary between a block of intra-prediction and a block of inter-prediction is conspicuous or not, the processing from step S609 onward may be performed for all blocks.

As described above, according to the first embodiment, in a case where an image is encoded using different predicted images, it is possible to make the image quality deterioration caused by the difference in the predicted images less conspicuous.

In addition, in a case where the boundary between a block of intra-prediction and a block of inter-prediction is conspicuous, such as in a case where an area to which the coding target block belongs is flat and the quantization step size is large, the prediction mode selection unit 117 operates with an emphasis on reducing image quality deterioration. On the other hand, in a case where the boundary between a block of intra-prediction and a block of inter-prediction is inconspicuous, the prediction mode selection unit 117 operates with emphasis on coding efficiency. This makes it possible to reduce image quality deterioration due to differences in predicted images between blocks compared to the conventional art, without impairing coding efficiency.

[Modification]

Figure 10:
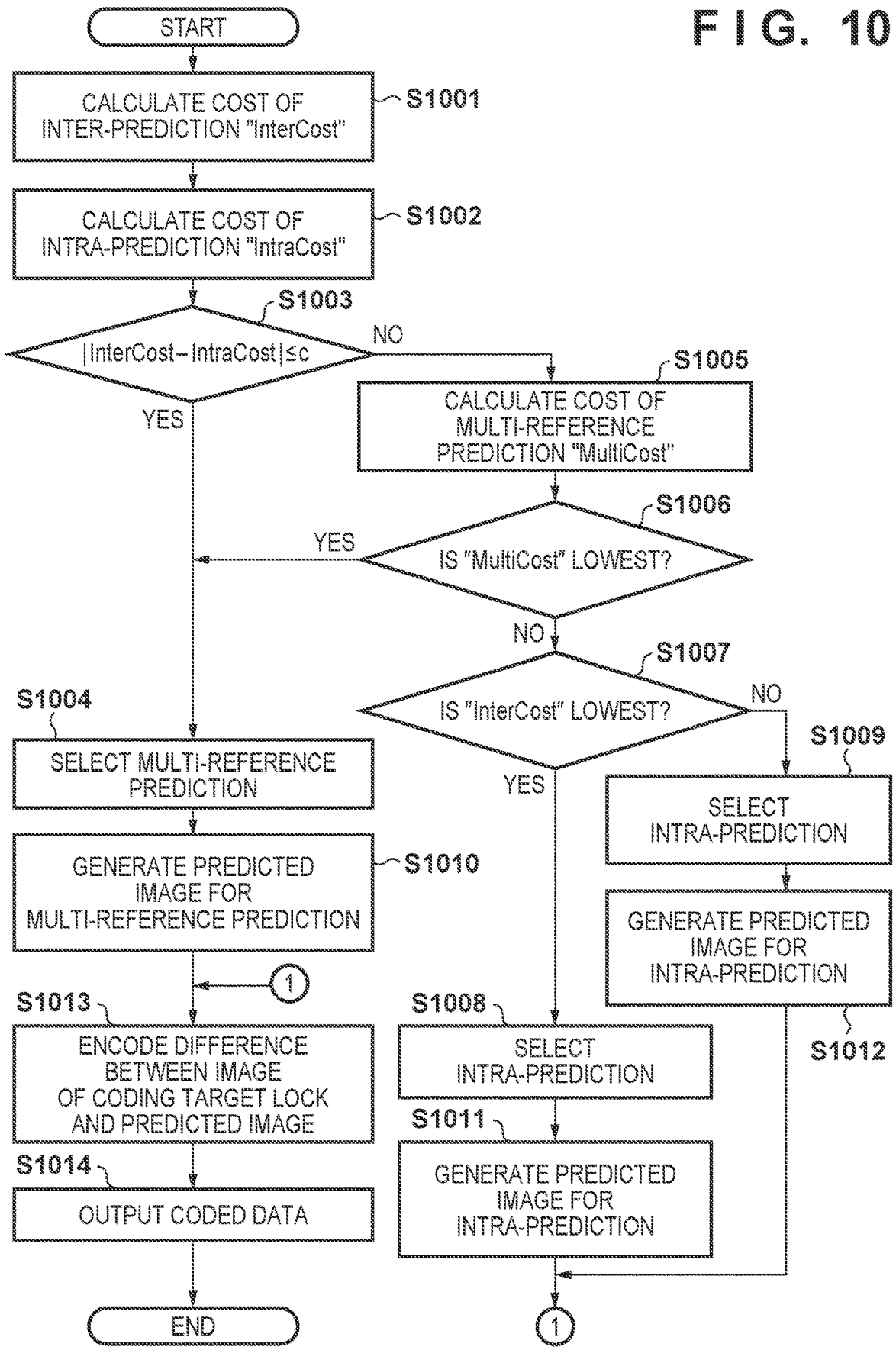
FIG. 10 is a flowchart illustrating a prediction mode determination method in the prediction mode selection unit according to a modification of the first embodiment.

Next, a method of generating coded data in the modification will be described with reference to FIG. 10.

As described above with reference to FIG. 3, the motion compensation unit 114 calculates the cost value in a case where the inter-prediction mode is applied to the coding target block (step S1001). Further, as described above with reference to FIG. 2, the intra-prediction unit 112 calculates the cost value in a case where the intra-prediction mode is applied to the coding target block (step S1002).

Then, as in step S611, the prediction mode selection unit 117 determines whether or not the absolute value of the difference between the cost value of the inter-prediction mode calculated in step S1001 and the cost value of the intra-prediction mode calculated in step S1002 is a constant c or less (step S1003). As a result of the determination, if the absolute value of the difference is the constant c or less (Yes in step S1003), the prediction mode selection unit 117 selects the multi-reference prediction mode (step S1004).

On the other hand, as a result of the determination, if the absolute value of the difference is greater than the constant c (No in step S1003), the prediction mode selection unit 117 calculates the cost value in a case where the multi-reference prediction mode is applied to the coding target block (step S1005). The prediction mode selection unit 117 compares the cost values of the inter-prediction mode, the intra-prediction mode, and the multi-reference prediction mode calculated in steps S1001, S1002, and S1005, respectively, and if the cost value of the multi-reference prediction mode is the lowest (Yes in step S1006), the multi-reference prediction mode is selected (step S1004).

If the cost value of the multi-reference prediction mode is not the lowest (No in step S1006) and the cost value of the inter-prediction mode is the lowest (Yes in step S1007), the inter-prediction mode is selected (step S1008). If the cost value of the multi-reference prediction mode is not the lowest (No in step S1006) and the cost value of the inter-prediction mode is not the lowest (No in step S1007), that is, if the cost value of the intra-prediction mode is the lowest, the intra-prediction mode is selected (step S1009).

Then, if the multi-reference prediction mode is selected in step S1004, the multi-reference prediction unit 115 combines the predicted image data for intra-prediction output from the intra-prediction unit 112 and the predicted image data for inter-prediction output from the motion compensation unit 114, and generates predicted image data for multi-reference prediction (step S1010). Alternatively, if the inter-prediction mode is selected in step S1008, the motion compensation unit 114 generates predicted image data for inter-prediction (step S1011) as in step S304. Alternatively, if the intra-prediction mode is selected in step S1009, the intra-prediction unit 112 generates predicted image data for intra-prediction (step S1012). The predicted image data generated in step S1010, S1011 or S1012 is output to the adder 102 by the prediction mode selection unit 117.

Then, the adder 102 generates difference image data between the block image data to be encoded output from the frame buffer and the predicted image data, and encodes the difference image data using each unit as described above (step S1013), and the coded result is output as a coded stream (step S1014).

Before starting the processing of step S1001, similarly to step S601, the prediction mode selection unit 117 may determine whether or not the flat area flag output from the feature detection unit 116 is 0 and/or whether or not the quantization step size Qstep of the coding target block obtained from the quantization control unit 106 is smaller than the threshold Thqstep, and if the flat area flag is 1 and/or the quantization step size Qstep is equal to or greater than the threshold Thqstep, the processes after step S1001 may be executed. Alternatively, in a case where the dynamic range of the input image is a high dynamic range equal to or greater than a predetermined value, the processing from step S1001 onward may be executed.

Second Embodiment

Next, a second embodiment of the present invention will be described.

In the latest video coding methods such as HEVC and VVC, it is possible to encode a moving image recorded with 10-bit, 12-bit, or other multi-bit HDR (High Dynamic Range) or a Log-recorded moving image. A Log-recorded moving image is a moving image shot using a gamma curve uniquely defined by the manufacturer of a digital camera or the like, so that recording can be performed in a higher dynamic range, unlike the gamma curve defined by standards such as BT.709.

Figure 7A:
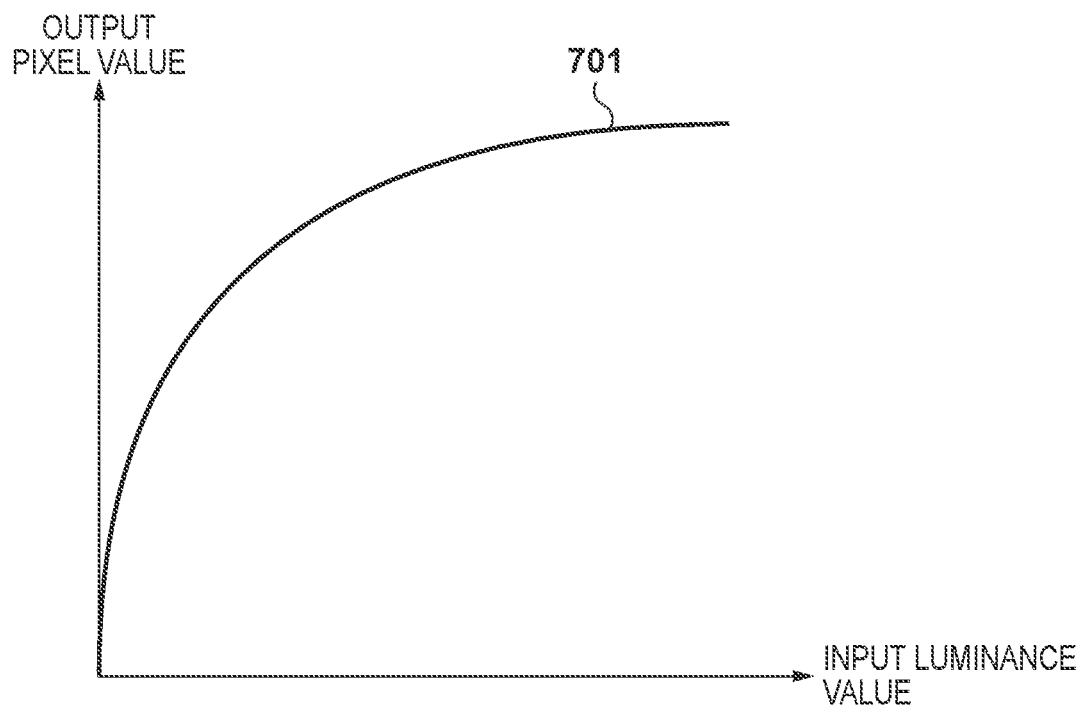
FIG. 7A is a diagram illustrating an example of a gamma curve in HDR-recording.

HDR-recorded or Log-recorded moving images (high dynamic range images) are displayed after being converted using a set gamma curve at the time of outputting the images to a display. FIG. 7A shows the relationship between input luminance values (actual brightness at the time of shooting) and output pixel values (pixel value after coding) in HDR-recording. The horizontal axis shows the input luminance values, the vertical axis shows the output pixel values, and the relationship between the input values and the output values are defined by a gamma curve 701. In a range where the input value is small, the curve is steep in the vertical direction, and many pixel values are assigned with respect to the range of the input values. On the other hand, in a range where the input value is large, the curve becomes gentle, and the number of pixel values assigned with respect to the range of the input values is small. By assigning the output pixel values to the input luminance values in this way, recording with a high dynamic range is made possible.

Figure 7B:
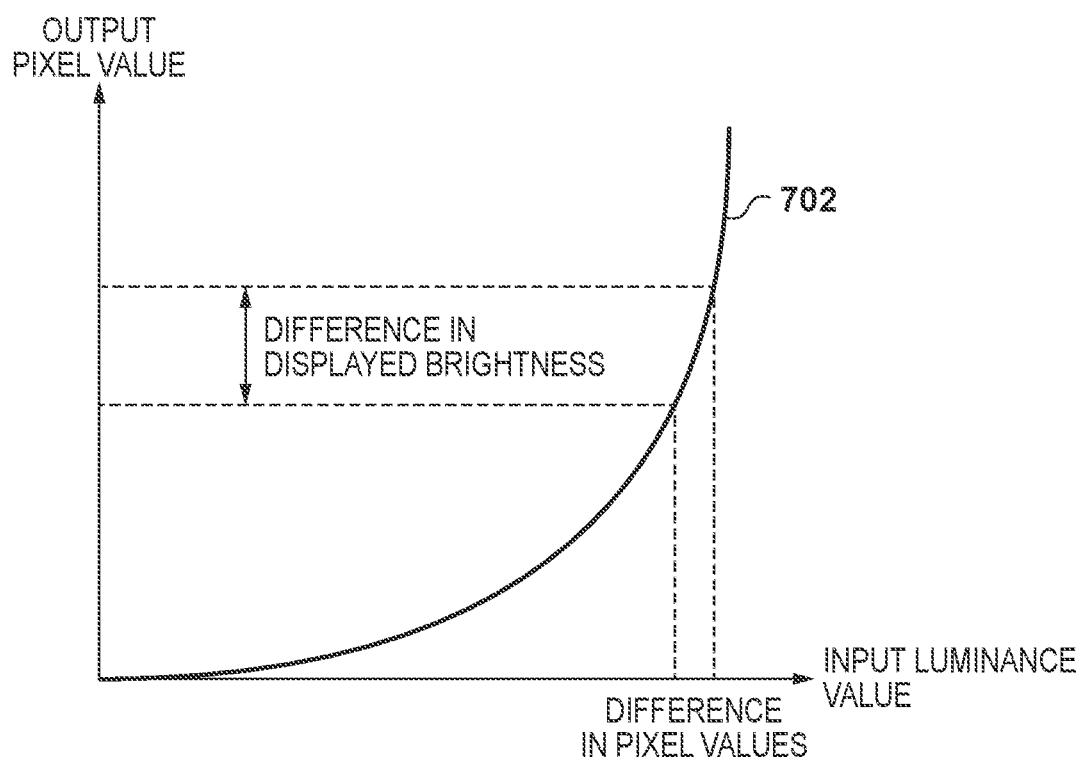
FIG. 7B is a diagram illustrating an example of a gamma curve in HDR-display.

FIG. 7B shows the relationship between input values (pixel value after coding) and output luminance values (brightness displayed on a display) in HDR-display. The horizontal axis shows the input pixel values, and the vertical axis shows the output luminance values that are actually displayed, and the relationship between the input values and the output values is defined by a gamma curve 702, which is the opposite relationship to the gamma curve 701. In a range where the input values are small, the curve is gentle in the vertical direction, and the amount of change in displayed brightness with respect to the range of the input values is small. On the other hand, in a range where the input values are large, the curve becomes steep, and the amount of change in displayed brightness with respect to the range of the input values is large. By assigning output the luminance values to the input pixel values in this way, HDR-recorded moving images can be displayed with correct brightness.

As described above, in HDR-recorded or Log-recorded moving images, the amount of change in brightness that is displayed on a display is larger with respect to the amount of change in coded pixel values compared to moving images recorded with Standard Dynamic Range (SDR). In other words, deterioration in image quality after coding is amplified and displayed on the display. In addition, this tendency becomes more conspicuous in an area with high luminance values (referred to as "high-luminance [area] area" or "bright area"), and image quality degradation due to predicted images being different between blocks, which is the problem that the present invention is to solve, is also more conspicuous in this area.

In the second embodiment, such HDR-recorded or Log-recorded moving images (for convenience, referred to as "HDR images") are a coding target, and image quality deterioration that occurs in a bright area of HDR images is aimed at being reduced. Note that in the second embodiment, differences from the first embodiment will be mainly described, and descriptions of parts that are the same as those in the first embodiment will be omitted.

The overall configuration of an image encoding apparatus in the second embodiment is the same as that shown in FIG. 1, but the configuration of the feature detection unit 116 is different from that described with reference to FIG. 5 in the first embodiment.

Figure 8:
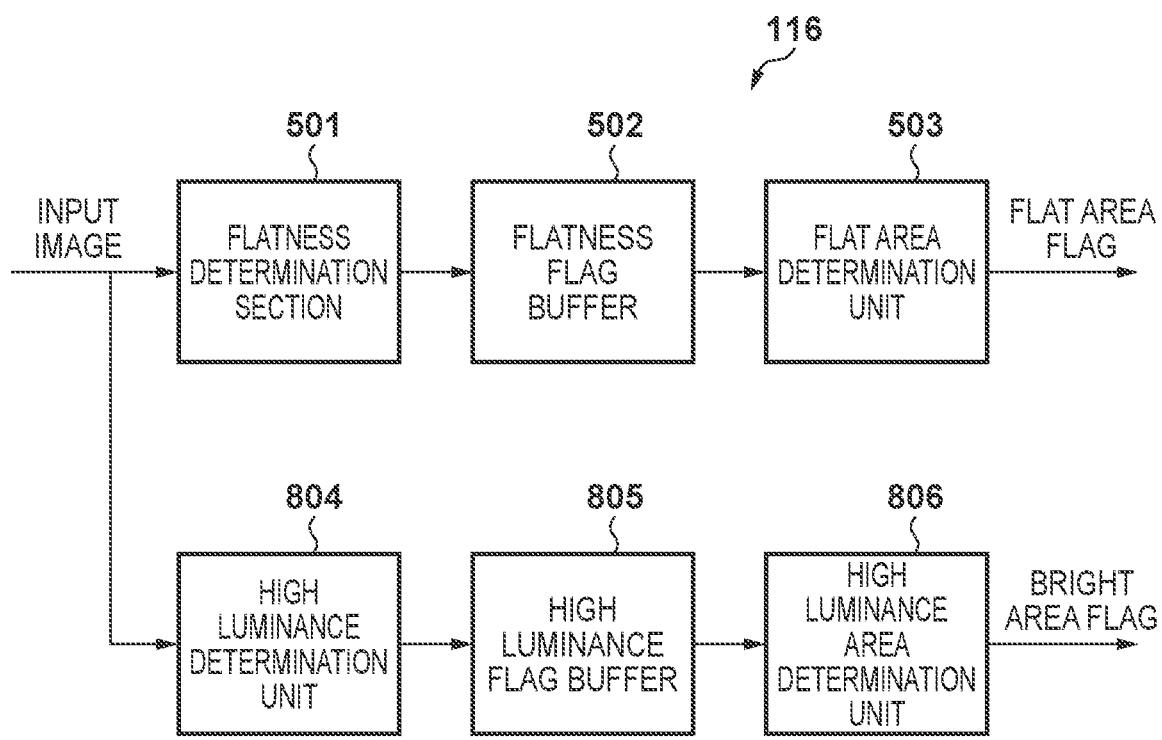
FIG. 8 is a block diagram illustrating an example of internal configuration of the feature detection unit according to a second embodiment.

FIG. 8 is a block diagram showing an example of an internal configuration of the feature detection unit 116 according to the second embodiment. As in the first embodiment, the feature detection unit 116 in the second embodiment includes the flatness determination unit 501, the flatness flag buffer 502, and the flat area determination unit 503 for determining whether or not a coding target block belongs to a flat area of an image. Furthermore, the feature detection unit 116 has a high luminance determination unit 804, a high luminance flag buffer 805, and a high luminance area determination unit 806 for determining whether or not the coding target block belongs to a bright area of the image.

Note that the flatness determination unit 501, flatness flag buffer 502, and flat area determination unit 503 operate in the same manner as in the first embodiment, so their description is omitted here.

The high luminance determination unit 804 acquires an input image of the coding target block and generates a flag (high luminance flag) indicating whether or not the coding target block is of high luminance. Various methods are conceivable for determining whether or not the luminance is high, and in this embodiment, an average of luminance values of pixels in the coding target block is calculated, and if the calculated average luminance value is larger than a predetermined threshold, it is determined that the luminance is high. Further, in the present embodiment, the flag value is set to "1" if it is determined that the luminance is high, and the flag value is set to "0" if it is determined that the luminance is not high.

The high luminance flag buffer 805 temporarily holds the high luminance flag output from the high luminance determination unit 804. The high luminance flag buffer 805 also holds high luminance flags of a plurality of coded blocks, and the high luminance area determination unit 806, which will be described later, can appropriately refer to this information. The high luminance flag buffer 805 in this embodiment holds at least the high luminance flags of the coded blocks that are adjacent to the coding target block in the upper direction, the upper left direction, and the left direction.

The high luminance area determination unit 806 determines whether or not the coding target block belongs to the bright area of the image based on the high luminance flag of the coding target block held in the high luminance flag buffer 805 and the high luminance flags of a plurality of coded blocks. Various methods are conceivable for determining whether or not the coding target block belongs to the bright area, and in this embodiment, if the high luminance flag of the coding target block is "1" and if the flag values of the high luminance flags of the coded blocks adjacent to the coding target block in the upper direction, the upper left direction and the left direction are all "1", it is determined that the coding target block belongs to the bright area. In the present embodiment, the flag value is "1" if it is determined that the coding target block belongs to the bright area, and the flag value is "0" if it is determined that the coding target block does not belong to the bright area.

Note that the method of determining whether or not the coding target block belongs to the bright area is not limited to the example described using FIG. 8. For example, the feature detection unit 116 may simply determine that the coding target block belongs to a bright area if the average luminance value of the coding target block is greater than a predetermined threshold. Alternatively, the feature detection unit 116 may determine a high luminance flag for each block of a certain frame and store the high luminance flags in the high luminance flag buffer 805 before starting coding processing of the frame. With this, the high luminance area determination unit 806 can refer not only to the high brightness flags of blocks adjacent to the coding target block, but also to the high brightness flags of blocks farther away from the coding target block, thereby it is possible to improve the accuracy of determination whether the coding target block belongs to the bright area.

In this way, the feature detection unit 116 generates a flat area flag and a bright area flag and outputs them to the prediction mode selection unit 117.

Figure 9:
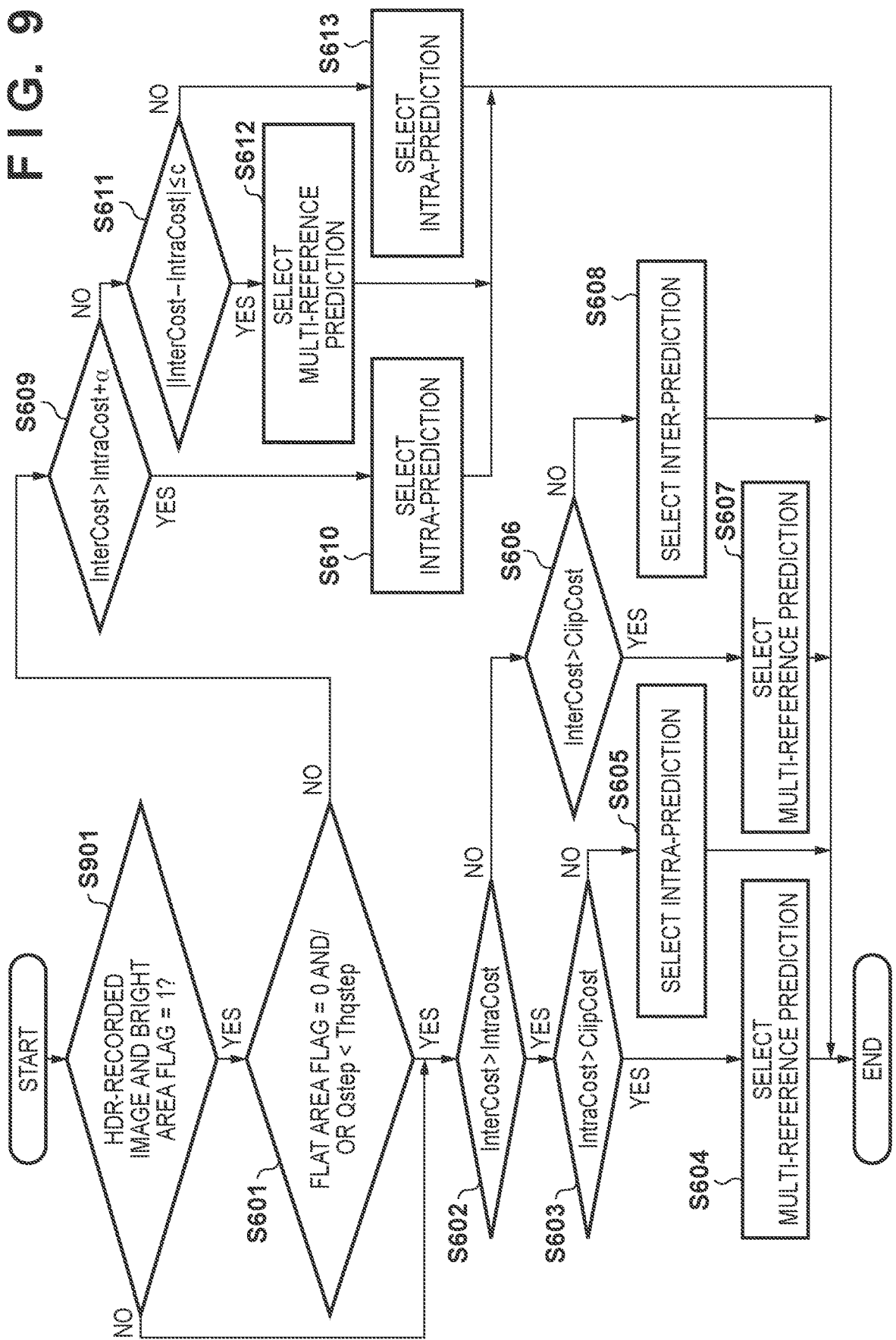
FIG. 9 is a flowchart illustrating a prediction mode determination method in the prediction mode selection unit according to the second embodiment.

FIG. 9 is a flowchart showing a prediction mode determination method in the prediction mode selection unit 117 in the second embodiment. The same reference numerals are given to the same processes as those shown in FIG. 6, and the description thereof is omitted.

The processing in the second embodiment shown in FIG. 9 is different from the processing in the first embodiment shown in FIG. 6 in the point that a process (step S901) for determining whether or not a moving image to be encoded is a HDR-recorded or Log-recorded moving image, and whether or not a block belongs to a bright area is added. It should be noted that information on whether or not the moving image to be coded is HDR-recorded or Log-recorded is sent to the image coding apparatus in advance from a control source of the image encoding apparatus such as a CPU (not shown).

In step S901, if the moving image to be coded is an HDR-recorded or Log-recorded moving image and if the bright area flag is 1, then the prediction mode selection unit 117 advances the process to step S601. On the other hand, in step S901, if the image to be coded is not an HDR-recorded or Log-recorded moving image and/or if the bright area flag is not 1, then the prediction mode selection unit 117 skips the process of step S601, and advances the process to step S602.

That is, if the moving image to be coded is an HDR-recorded or Log-recorded moving image, if the coding target block belongs to a bright area and a flat area, and if the quantization step size is large, the prediction mode selection unit 117 puts a weight on reducing image quality deterioration and operates so that image quality deterioration due to a difference between predicted images of blocks becomes less conspicuous (steps S609 to S613).

On the other hand, in cases other than the above, the prediction mode selection unit 117 puts a weight on coding efficiency and operates to always select a prediction mode with the lowest cost value (steps S602 to S608).

As described above, according to the second embodiment, not only the flatness of an area to which the coding target block belongs and the quantization step size, but also whether or not the image to be coded is HDR-recorded or Log-recorded moving image and whether or not the coding target block belongs to a bright area are considered, and whether to prioritize coding efficiency or reduction of image quality deterioration is selected. As a result, it is possible to reduce image quality deterioration, which is particularly conspicuous in bright areas, compared to the conventional art, without impairing the coding efficiency when coding an HDR image.

According to this invention, it is possible to make image quality deterioration due to differences in predicted images inconspicuous in a case where one image is coded using different predicted images.

Other Embodiment

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A coding apparatus comprising:
one or more processors and/or circuitry which function as a plurality of units comprising:
   (1) a dividing unit that divides an input image into blocks;
   (2) a coding unit that executes coding processing on each of the blocks using one of prediction modes of (a) an inter prediction mode that generates an inter predicted image by performing inter prediction on a block and encodes a difference between the block and the inter predicted image, (b) an intra prediction mode that generates an intra predicted image by performing intra prediction on a block and encodes a difference between the block and the intra predicted image, and (c) a multi reference prediction mode that generates a multi predicted image by combining an inter predicted image and an intra predicted image generated from a block, and encodes a difference between the block and the multi predicted image;
   (3) an output unit that outputs a result of the coding processing as coded data; and
   (4) a calculation unit that calculates a first coding cost in a case where the block is coded in the inter prediction mode and a second coding cost in a case where the block is coded in the intra prediction mode using a predetermined function,
wherein the coding unit executes the coding processing on the block using the multi reference prediction mode in a case where a difference between the first coding cost and the second coding cost is equal to or less than a threshold, and executes the coding processing on the block using the prediction mode with a smaller one of the first coding cost and the second coding cost in a case where the difference between the first coding cost and the second coding cost is larger than the threshold.

2. The coding apparatus according to claim 1, wherein the calculation unit further calculates a third coding cost in a case where the block is coded in the multi reference prediction mode using a predetermined function, and
wherein the coding unit executes the coding processing on the block using the prediction mode with a smallest one of the first coding cost, the second coding cost, and the third coding cost in a case where the difference between the first coding cost and the second coding cost is larger than a threshold.

3. The coding apparatus according to claim 1, wherein a coding target block of the coding unit is included in a flat area or a high luminance area.

4. The coding apparatus according to claim 1, wherein the input image is of high dynamic range.

5. The coding apparatus according to claim 1, wherein a quantization step used in the coding processing is greater than a predetermined value.

6. The coding apparatus according to claim 1, wherein the multi predicted image is generated by weighting and combining the inter predicted image and the intra predicted image.

7. The coding apparatus according to claim 1, wherein the coding cost is calculated based on (1) a sum of absolute differences corresponding to values obtained by (a) taking a difference between the input image and a reference image which is decoded after adding the difference to the predicted image and (b) performing Hadamard transform on the difference, (2) a quantization parameter, and (3) a code amount.

8. A coding method comprising:
dividing an input image into blocks;
executing coding processing on each of the blocks using one of prediction modes of (a) an inter prediction mode that generates an inter predicted image by performing inter prediction on a block and encodes a difference between the block and the inter predicted image, (b) an intra prediction mode that generates an intra predicted image by performing intra prediction on a block and encodes a difference between the block and the intra predicted image, and (c) a multi reference prediction mode that generates a multi predicted image by synthesizing an inter predicted image and an intra predicted image generated from a block, and encodes a difference between the block and the multi predicted image;
outputting a result of the coding processing as coded data; and
calculating a first coding cost in a case where the block is coded in the inter prediction mode and a second coding cost in a case where the block is coded in the intra prediction mode using a predetermined function,
wherein the coding processing is executed on the block using the multi reference prediction mode in a case where a difference between the first coding cost and the second coding cost is equal to or less than a threshold, and the coding processing is executed on the block using the prediction mode with a smaller one of the first coding cost and the second coding cost in a case where the difference between the first coding cost and the second coding cost is larger than the threshold.

9. A non-transitory computer readable storage medium, the storage medium storing a program that is executable by a computer,
wherein the program includes program code for causing the computer to (1) divide an input image into blocks; (2) execute coding processing on each of the blocks using one of prediction modes of (a) an inter prediction mode that generates an inter predicted image by performing inter prediction on a block and encodes a difference between the block and the inter predicted image, (b) an intra prediction mode that generates an intra predicted image by performing intra prediction on a block and encodes a difference between the block and the intra predicted image, and (c) a multi reference prediction mode that generates a multi predicted image by combining an inter predicted image and an intra predicted image generated from a block, and encodes a difference between the block and the multi predicted image; (3) output a result of the coding processing as coded data; and (4) calculate a first coding cost in a case where the block is coded in the inter prediction mode and a second coding cost in a case where the block is coded in the intra prediction mode using a predetermined function,
wherein the coding processing is executed on the block using the multi reference prediction mode in a case where a difference between the first coding cost and the second coding cost is equal to or less than a threshold, and executes the coding processing is executed on the block using the prediction mode with a smaller one of the first coding cost and the second coding cost in a case where the difference between the first coding cost and the second coding cost is larger than the threshold.

10. The storage medium according to claim 9, wherein the computer comprises one or more processors and/or circuitry.

* * * * *